United States Patent
Banzhaf et al.

(10) Patent No.: US 9,940,150 B2
(45) Date of Patent: Apr. 10, 2018

(54) POLICY BASED VIRTUAL RESOURCE ALLOCATION AND ALLOCATION ADJUSTMENT

(71) Applicant: International Business Machines Corporation, Armonk, NY (US)

(72) Inventors: Gerhard Banzhaf, Nufringen (DE); James M. Jenks, Vestal, NY (US); Angel Nunez Mencias, Stuttgart (DE); Eric A. Weinmann, Endicott, NY (US)

(73) Assignee: International Business Machines Corporation, Armonk, NY (US)

(*) Notice: Subject to any disclaimer, the term of this patent is extended or adjusted under 35 U.S.C. 154(b) by 340 days.

(21) Appl. No.: 14/633,238

(22) Filed: Feb. 27, 2015

(65) Prior Publication Data
US 2016/0253195 A1 Sep. 1, 2016

(51) Int. Cl.
*G06F 9/455* (2006.01)
*G06F 9/50* (2006.01)

(52) U.S. Cl.
CPC ........ *G06F 9/45558* (2013.01); *G06F 9/5038* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2010/0107172 A1 | 4/2010 | Calinescu et al. | |
| 2010/0125844 A1* | 5/2010 | Mousseau | G06F 9/50 718/1 |
| 2011/0029882 A1* | 2/2011 | Jaisinghani | H04L 41/12 715/736 |
| 2013/0262390 A1* | 10/2013 | Kumarasamy | H04L 41/08 707/649 |
| 2013/0297795 A1 | 11/2013 | McGrath et al. | |
| 2014/0006621 A1 | 1/2014 | Sims | |
| 2014/0165060 A1* | 6/2014 | Muller | G06F 9/5022 718/1 |
| 2014/0173620 A1* | 6/2014 | Chai | G06F 9/5027 718/104 |
| 2015/0040131 A1* | 2/2015 | Shan | G06F 9/5027 718/1 |

OTHER PUBLICATIONS

U.S. Appl. No. 14/870,405, filed Sep. 30, 2015 entitled "Policy Based Virtual Resource Allocation and Allocation Adjustment".
Appendix P "IBM Patents and Patent Applications Treated as Related" filed Sep. 30, 2015; pp. 2.

* cited by examiner

*Primary Examiner* — Diem Cao
(74) *Attorney, Agent, or Firm* — Tihon Poltavets

(57) ABSTRACT

A computer-implemented method, carried out by one or more processors, for policy based virtual resource allocation. In an embodiment, the method includes identifying a number of host resources specified by host resource requirements for a first resource consumer. The method determines if the host resource requirements include a list of host resource pools for the first resource consumer. Responsive to determining that the host resource requirements include the list of host resource pools for the first resource consumer, a first set of eligible host resource pools is identified. An allocation policy may be identified, where the allocation policy includes one or more parameters for allocating host resources. Host resources from the first set of eligible host resource pools are allocated based on the allocation policy.

14 Claims, 4 Drawing Sheets

POLICY BASED VIRTUAL RESOURCE ALLOCATION AND ALLOCATION ADJUSTMENT

BACKGROUND

The present invention relates generally to virtual machines and more particularly to policy driven virtual resource allocation.

In various virtual system environments, including clustered and cloud system environments, virtual machines can be deployed and executed based on virtual resource definitions. Virtual resource definitions for virtual machines may include specific requirements regarding the number and types of resources, where types of resources include capabilities of each individual resource or group of resources. Typically, available resources are often over-committed and only assigned to virtual machines as required. In addition to processor and memory resources, virtual machines typically require other resources such as, I/O adapters. These adapters are often virtual adapters, hosted by physical adapters that share the limited capacities and capabilities provided by the physical adapters. In the event virtual machines are activated and deactivated with high frequency, the required adapter resources need to be assigned, released, and reassigned.

SUMMARY

Embodiments of the present invention include a method, computer program product and computer system for policy based virtual resource allocation. A computer-implemented method includes identifying a number of host resources specified by host resource requirements for a first resource consumer. The method determines if the host resource requirements include a list of host resource pools for the first resource consumer. Responsive to determining that the host resource requirements includes the list of host resource pools for the first resource consumer, a first set of eligible host resource pools is identified. An allocation policy may be identified, where the allocation policy includes one or more parameters for allocating host resources. Host resources from the first set of eligible host resource pools are allocated based on the allocation policy.

DETAILED DESCRIPTION

Resource allocation is typically performed on demand when resources are needed to activate a resource consumer or when additional resources are requested for an active resource consumer. Correspondingly, resource de-allocation is typically performed when the resource consumer is deactivated. Therefore, on subsequent resource consumer activations, different host resources can be allocated to the virtual resources. Also, the same host resource can be allocated to different virtual resources of the same or different resource consumers at different points in time. Virtual resources that are based on a particular physical resource, share the capacity and capabilities of the particular physical resource. Examples include virtual network adapters (vNIC), virtual storage area network adapters (vHBA), other types of virtual I/O adapters based on physical adapters, and virtual accelerator engines based on a physical accelerator engine. Examples of a physical accelerator engine include a cryptographic engine, a compression engine, and a sorting engine.

In order to utilize a virtual resource, a resource activation is typically performed. Resource activation actions can include clearing main memory before assignment to a resource consumer, and updating network configuration and storage access tables in host firmware (e.g., physical server and/or hypervisors). The activation procedure can depend on a virtualization type, where the virtualization type is how the host resource is virtualized so that, for instance, a single physical host resource represents multiple virtualized host resources. The activation procedure can also depend on which virtual machine the resource consumer is deployed, more particularly, on which hypervisor level. Activation of both the virtual resource and the assigned host resource enables resource utilization by server firmware, hypervisors, and privileged operating systems.

Figure 1:
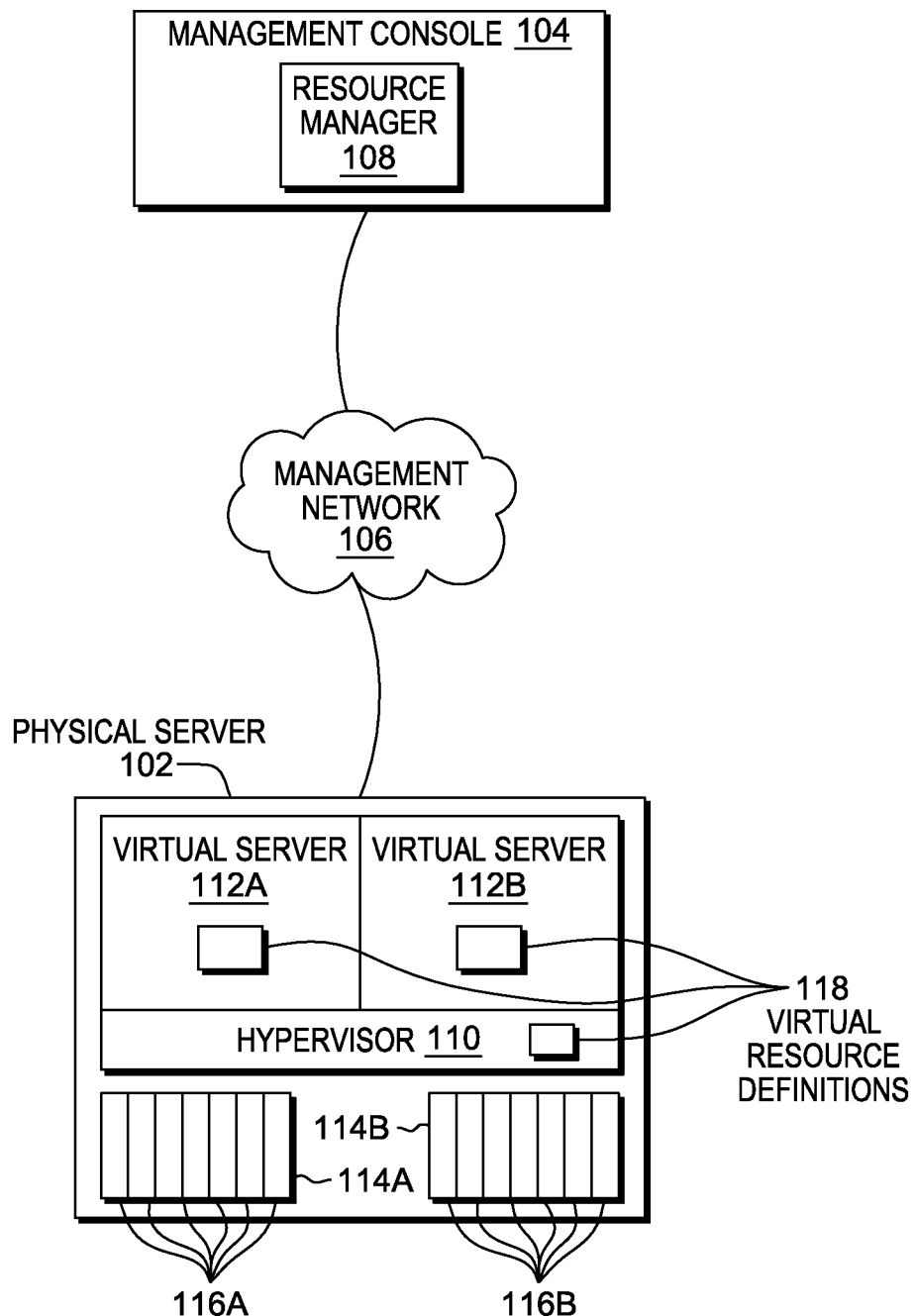
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment, in accordance with one embodiment of the present invention. The distributed data processing environment includes physical server 102 and management console 104, interconnected over management network 106.

Physical server 102 represents a computer system utilizing clustered computers and components that act as a single pool of seamless resources when accessed through an I/O network (not illustrated in FIG. 1), as is common in data centers and with cloud computing applications. In general, physical server 102 is representative of any programmable electronic device or combination of programmable electronic devices capable of executing machine-readable program instructions and communicating with other computer devices via a network. In another embodiment, there are multiple physical servers 102 connected to management network 108.

Management console 104 manages physical server 102 and the components therein. Management console 104 may provide both a graphical user interface (GUI) and an application programming interface (API) for automated configuration management. Resource manager 108, residing in management console 104, enables implementation of policy driven host resource allocation and host resource allocation adjustment. Resource manager 108 may utilize host resource requirements, where the host resource requirements specify resource allocations for resource definitions of a particular virtual machine (e.g., virtual server 112A and 112B). Resource manager 108 may also utilize host resource characteristics for resource allocations, where host resource characteristics may include an adapter type, connectivity to a particular type of a network, and a particular type of assist or acceleration processor (e.g., cryptographic processors).

In this embodiment, hypervisor 110 provides execution environments for multiple virtual servers, such as virtual server 112A and virtual server 112B, to run on physical server 102. In addition to virtual server 112A and 112B, hypervisor 110 may host one or more additional hypervisors not illustrated in FIG. 1. Therefore, virtual server 112A, virtual server 112B, and hypervisor 110 may execute within one or more underlying levels of hypervisors. A server cluster may include one or more physical servers 102, therefore, virtual servers may execute on different nodes (i.e., physical servers) of the server cluster. For discussion purposes, hypervisor 110, virtual server 112A, and virtual server 112B each represent an example of a virtual machine.

Virtual server 112A, virtual server 112B, and hypervisor 110 are resource consumers and each may include virtual resource definitions 118. Virtual resource definitions 118 may include, but are not limited to, processors, memory, and I/O ports. Virtual resources are supported by physical resources, which may exist internally or externally of physical server 102. Typically, external and internal host resources include virtual host resources. Examples of virtual host resources include virtual processors based on physical processors and virtual network adapters are based on physical network adapters. Examples of providers virtual host resources may include physical server 102 (hardware and firmware), hypervisor 110, or an independent virtualization entity not illustrated in FIG. 1. In this embodiment, host resource pools 114A and 114B (i.e., internal physical host resource) include host resources 116A and 116B (i.e., internal virtual host resources), respectively. In another embodiment, an I/O network may connect to external host resource pools (i.e., external physical host resources), where each external host resource pool includes external host resources (i.e., external virtual host resources).

In general, management network 106 may be any combination of connections and protocols that may support communications between physical server 102 and management console 104. Management network 106 may include, for example, a local area network (LAN), a wide area network (WAN), such as the internet, a cellular network, or any combination of the preceding, and may further include wired, wireless, and/or fiber optic connections.

Figure 2:
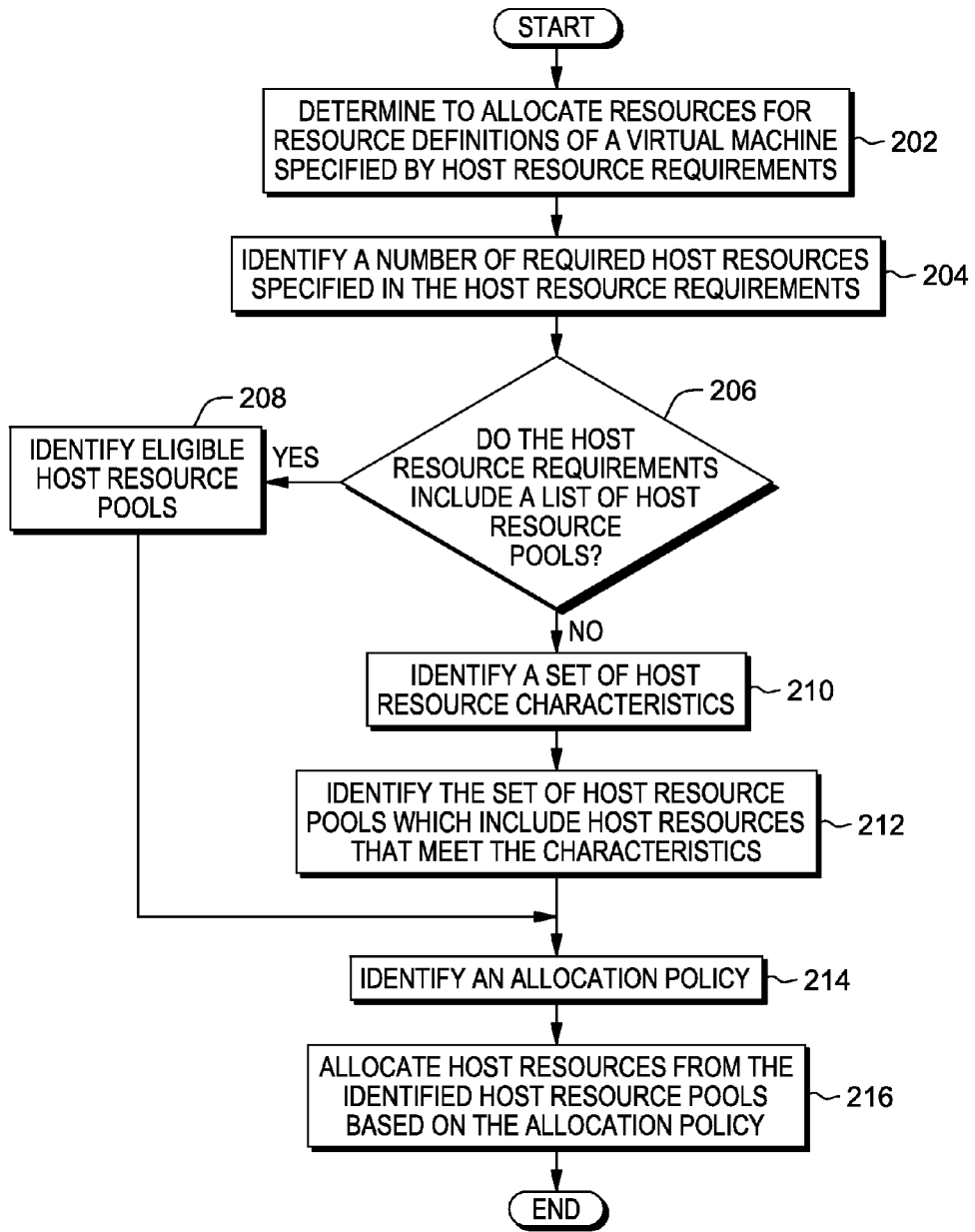
FIG. 2 is a flowchart depicting one embodiment of an allocation method that may be executed by a resource manager, in accordance with the present invention.

FIG. 2 is a flowchart depicting one embodiment of an allocation method that may be executed by a resource manager, in accordance with the present invention. As depicted, the allocation method includes determining (202) to allocate resources, identifying (204) a number of required host resources, determining (206) whether a list of host resource pools is included, identifying (208) eligible host resource pools, identifying (210) a set of host resource characteristics, identifying (212) host resources that meet the characteristics, identifying (214) an allocation policy, and allocating (216) host resources based on the allocation policy. In one embodiment, the allocation method is conducted by resource manager 108.

The method may commence by determining (202) to allocate resources for resource definitions of a virtual machine specified by host resource requirements. Resource manager 108 may perform resource allocation, the allocation of host resources according to resource definitions, when a virtual machine that includes the resource definitions is activated or when there are additions to resource definitions of an active virtual machine. Resource manager 108 may also perform resource deallocation, the releasing of assigned host resource from a virtual machine, when the virtual machine is deactivated or when resource definition are removed from the virtual machine. Resource allocation and resource deallocation are typically single step operations but in conjunction with the resource allocation and deallocation, certain resource activations and resource deactivations actions are required. There are situations where a virtual machine is stopped and resources assigned to the stopped virtual machine are not needed to support another virtual machine. As a result, resource manager 108 does not deallocate and deactivate the resources of the stopped virtual machine. However, if the stopped virtual machine is resumed and the resources are still allocated, resource manager 108 assesses the current resource allocation based on a specified allocation policy and performs an allocation adjustment accordingly.

Resource requirements may include mandatory and optional allocation requirements. In one example, a mandatory allocation requirement of maximum availability type may specify that host resources being allocated to a set of resource definitions should be distributed across at least two different host resource pools. As a result, if resource manager 108 determines there is only a single host resource pool from which the host resources may be allocated, resource manager 108 determines that this allocation request has failed. In another example, an optional allocation requirement of maximum availability type may specify that host resources being allocated to a set of resource definitions should be distributed across as many host resource pools as possible. As a result, if resource manager 108 determines there is only a single host resource pool from which the host resources may be allocated, resource manager 108 determines this allocation request will not fail. A single resource requirement may include a combination of mandatory and optional allocation requirements. For example, a host resource requirement of high availability type may specify that host resources being allocated to a set of resource definitions should be distributed across as many host resource pools as possible and should be distributed across at least two different host resource pools.

The method may continue by identifying (204) a number of required host resources specified in the host resource requirements. Host resource requirements specify a number of host resources required for a virtual machine to operate. The number of host resources required may originate from one or more host resource pools unless there are mandatory allocation requirements specifying otherwise.

The method may continue by determining (206) whether the host resource requirements include a list of host resource pools. In the event the host resource requirements include a list of host resource pools ("yes" branch, 206), identifying (208) eligible host resource pools. In the event the host resource requirements do not include a list of resource pools ("no" branch, 206), identifying (210) a set of host resource characteristics, where the host resource characteristics allow for the selection of host resource pools.

The method may continue by identifying (208) eligible host resource pools. The list of host resource pools include host resource pools with host resources which meet the host resource requirements of the virtual machine. Eligible host resource pools are host resource pools which include host resources which are currently not allocated or may be reallocated due to another virtual machine being inactive with the allocated host resources. Instances where host resources from a specific host resource pool cannot be deallocated, resource manager 108 deems that host resource pool as being ineligible.

The method may continue by identifying (210) a set of host resource characteristics. Host resource characteristics may include a particular adapter type, connectivity to a particular type or instance of a network, and a particular assist or acceleration processor. A particular adapter type may include any type of internal physical host resource or external physical host resource connected through an I/O network. A particular type of processor may include a cryptographic processor with multiple physical security measures.

The method may continue by identifying (212) the set of host resource pools which include host resources that meet the characteristics. Resource manager 108 may compile a list of possible host resource pools which may satisfy operations of the virtual machine. The list may include a list of host resource pools with host resources that meet all the resource requirements and a list of host resource pools with host resources that meet a majority of the resource requirements. Resource manager 108 may also determine if the host resources of a particular host resource pool are currently not allocated or may be reallocated due to another virtual machine being inactive with the allocated host resources. The resource pools with host resources that are currently not allocated or may be reallocated, remain on the list. Instances where host resources from a specific host resource pool cannot be deallocated, resource manager 108 removes the specific host resource pool from the list.

The method may continue by identifying (214) an allocation policy. Resource manager 108 may have multiple allocation policies based on parameters including maximum availability, maximum capacity, lowest utilization, and priority. The resource definitions for a virtual machine provide the allocation policy or in the event the resource definitions do not include an allocation policy, resource manager 108 may utilize a default allocation policy for the virtual machine. Maximum availability based allocation policy indicates that host resource allocation should be distributed across the maximum number of specified host resource pools. Maximum availability minimizes the impact of a single physical resource failure in the event that all virtual resources are supported by the single physical resource. The maximum availability based allocation may include a constraint where an allocation for a virtual machine fails if the required host resources are not distributed across a predetermined amount of host resource pools.

A maximum capacity based allocation indicates that resource manager 108 allocates from the host resource pool that has the highest number of virtual adapters left (i.e., host resources). A lowest utilization based allocation indicates that resource manager 108 allocates from the host resource pool with the lowest utilization, for example, lowest I/O rates or I/O throughputs. A priority based allocation indicates that resource manager 108 allocates host resources based on a given sequence of preference of host resource pools. Resource manager 108 may combine one or more policies in allocating host resources from host resource pools in conjunction with a priority based allocation specifying the order of the one or more policies.

The method may continue by allocating (216) host resources from the identified host resource pools based on the allocation policy. In the event a host resource is currently unallocated, resource manager 108 allocates the host resource to the associated virtual machine. In the event a host resource is currently allocated to another virtual machine, resource manager 108 deactivates the host resource, deallocates the host resource, and reallocates the host resource to the associated virtual machine from the other virtual machine.

Figure 3:
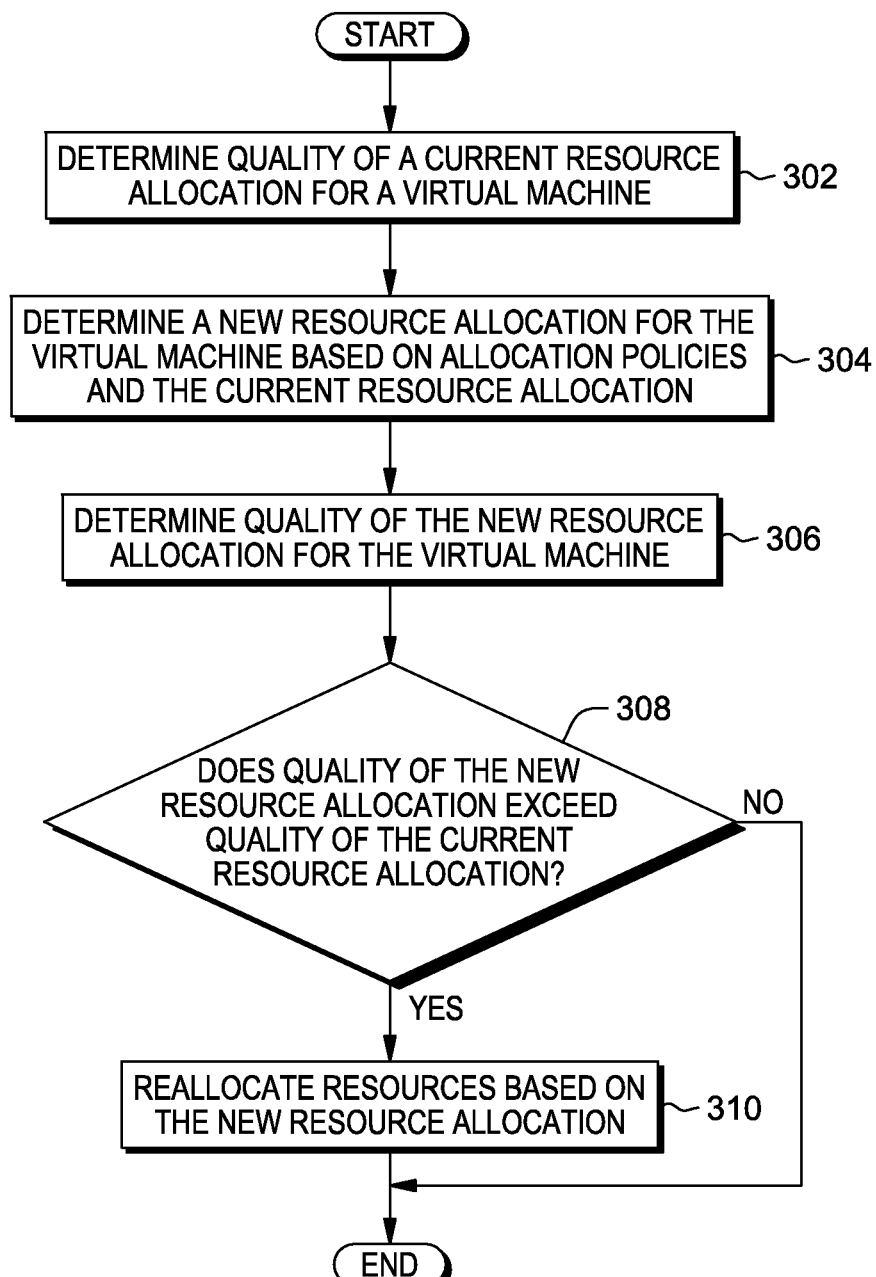
FIG. 3 is a flowchart depicting one embodiment of an allocation adjustment method that may be executed by a resource manager, in accordance with the present invention.

FIG. 3 is a flowchart depicting one embodiment of an allocation adjustment method that may be executed by a resource manager, in accordance with the present invention. As depicted, the allocation adjustment method includes determining (302) quality of a current resource allocation, determining (304) a new resource allocation, determining (306) quality of the new resource allocation, determining (308) whether quality exceeds the current resource allocation, and reallocating (310) resources. In one embodiment, the allocation adjustment method is conducted by resource manager 108.

The method may commence by determining (302) quality of a current resource allocation for a virtual machine. In one embodiment, resource manager 108 determines the quality of the current resource allocation for the machine by identifying how many of the one or more parameters of the allocation policy are met. In this embodiment, the allocation policy includes maximum availability and maximum capacity parameters which resource manager 108 utilizes as a measure of quality. Resource manager 108 determines the current resource allocation is distributed across a first set of multiple host resource pools meeting the maximum availability parameter. However, resource manager 108 determines the current resource allocation is distributed across the first set of multiple host resource pools that does not have the optimal number of virtual adapters available for additional allocations. As a result, resource manager 108 determines that the maximum capacity parameter is not met and that the current resource allocation may be distributed across a second set of multiple host resource pools that may meet the maximum capacity parameter.

In another embodiment, resource manager 108 determines that a single host resource pool out of a set of host resource pools allocated for a virtual machine is offline. Resource manager 108 identifies the single host resource pool currently offline and determines the performance shortcoming due to the single host resource pool being offline. Depending on the effect of the overall performance shortcoming, resource manager 108 determines a quality score for the current allocation. In one example, resource manager 108 may utilize a percentage to represent a quality score, where 100 percent is optimal quality and 50 percent may represent the current resource allocation where the host resource pool is offline.

The method may continue by determining (304) a new resource allocation for the virtual machine based on allocation policies and the current resource allocation. Resource manager 108 may perform the operational steps previously discussed in FIG. 2 to determine a new resource allocation for the virtual machine. Resource manager 108 may identify a number of required host resources specified in host resource requirements of the resource definitions for the virtual machine. If resource manager 108 determines the host resource requirements include a list of host resource pools, resource manager 108 identifies eligible host resource pools for the allocation. If resource manager 108 determines the host resource requirements do not include a list of host resource pools, resource manager 108 identifies a set of host resource characteristics and identifies the set of host resource pools which include host resources that meet the characteristics.

Resource manager 108 identifies the allocation policy with associated parameters and the host resource pools of the current resource allocation. In this embodiment, resource manager 108 avoids selecting host resource pools of the current resource allocation if there are other host resource pools which are available and meet the parameters of the allocation policy. Resource manager 108 selects host resource pools that meet the parameters of the allocation policy and are not currently assigned to the current resource allocation for the virtual machine. In another embodiment, resource manager 108 selects host resource pools that meet the parameters of the allocation policy, where a first portion of the host resource pools are currently allocated for the current resource allocation for the virtual machine. In this example, resource manager 108 does not select a second portion of the host resource pools currently allocated for the current resource allocation due to the second portion of host resource pools being offline.

The method may continue by determining (306) quality of the new resource allocation for the virtual machine. Resource manager 108 determines the quality of the new resource allocation in the same manner as determining the quality of the current resource allocation. However, resource manager 108 does not determine the quality of the new resource allocation for the machine by identifying how many of the one or more parameters of the allocation policy are met. Since resource manager 108 determines the new resource allocation based on the allocation policies and the current resource allocation, the one or more parameters of the allocation policy are already met. Resource manager 108 may determine the quality of the new resource allocation based on performance measures of each of the host resource pools from the set of host resource pools. Depending on the overall performance measure values for the set of host resource pools, resource manager 108 determines a quality score for the new resource allocation. Similar to the current resource allocation, resource manager 108 may utilize a percentage to represent a quality score.

The method may continue by determining (308) whether quality of the new resource allocation exceeds quality of the current resource allocation. In the event the quality of the new resource allocation exceeds the quality of the current resource allocation ("yes" branch, 308), reallocating (310) resources based on the new resource allocation. In the event the quality of the new resource allocation does not exceed the quality of the current resource allocation ("no" branch, 308), reallocation of resources based on the new resource allocation does not occur.

In one embodiment, resource manager 108 utilizes a reallocation threshold, where the threshold value is a difference in quality between the current resource allocation and the new resource allocation. If the difference in quality between the current resource allocation and the new resource allocation meets or exceeds the value of the reallocation threshold, resource manager 110 reallocates resources based on the new resource allocation. If the difference in quality between the current allocation and the new resource allocation does not meet the value of the reallocation threshold, resource manager 110 does not reallocate resources based on the new resource allocation. The reallocation threshold ensures resource manager 110 reallocates resources when the quality gains between the new resource allocation and the current resource allocation are worth obtaining.

The method may continue by reallocating (310) resources based on the new resource allocation. In this embodiment, resource manager 108 reallocates resources based on the new resource allocation by preparing each host resource of the current resource allocation for deactivation. Resource manager 108 deactivates each of the host resources no longer needed under the new resource allocation. Resource manager 108 may keep the host resources deactivated and allocated until another resource allocation for another virtual machine calls for that particular host resource. Resource manager 108 allocates the new host resources and prepares the new host resources for activation and activates the host resources under the new resource allocation.

Figure 4:
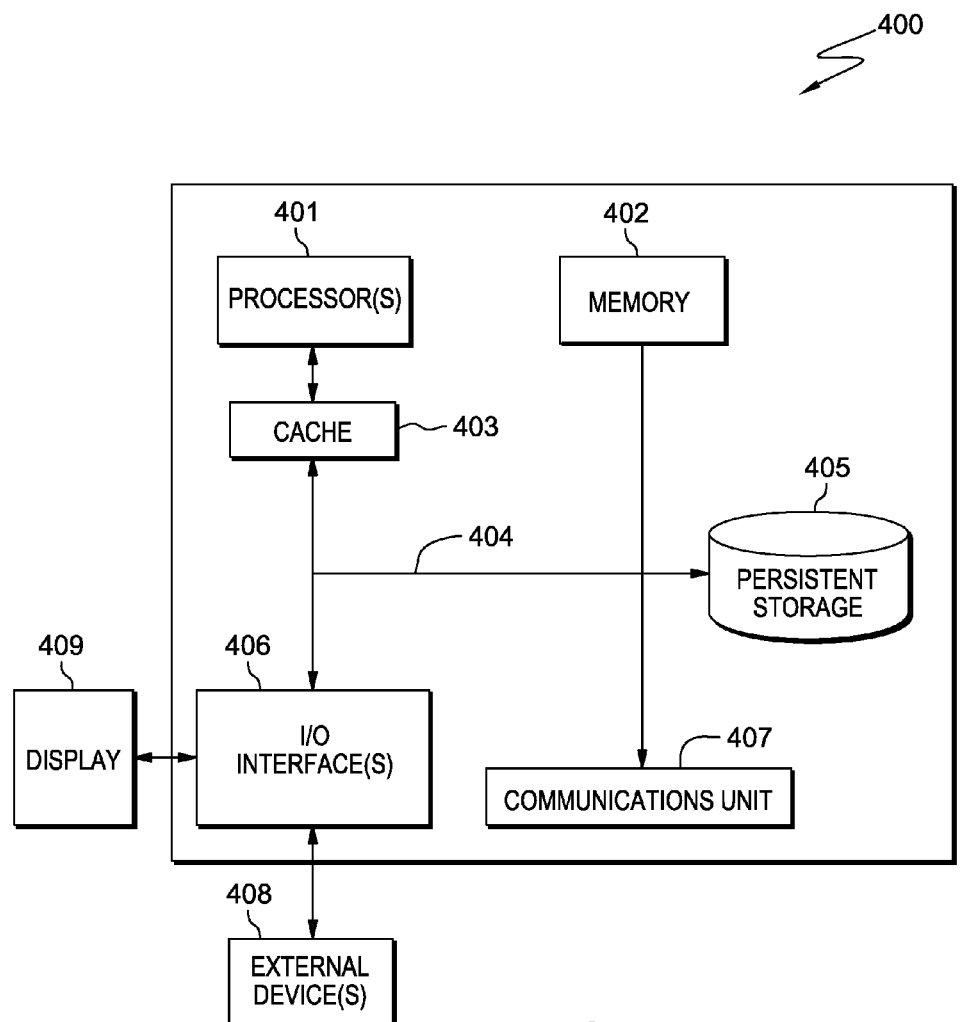
FIG. 4 is a block diagram of components of a computer system, such as the computer server of FIG. 1, in accordance with an embodiment of the present invention.

FIG. 4 depicts computer system 400, where management console 104 is an example of computer system 400 that includes resource manager 108. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for policy based virtual resource allocation, the computer program product comprising:
one or more computer readable tangible storage media and program instructions stored on at least one of the one or more storage media, the program instructions comprising:
program instructions to identify a number of host resources specified by host resource requirements for a first resource consumer;
program instructions to, responsive to determining that the host resource requirements includes a list of host resource pools for the first resource consumer, identify a first set of eligible host resource pools, wherein the first set of eligible host resource pools includes at least a first host resource that is re-allocable from an inactive second resource consumer;
program instructions to allocate to the first resource consumer, host resources from the first set of eligible host resource pools based on an allocation policy that includes one or more parameters for allocating host resources, wherein the allocated host resources from the first set of eligible host resource pools include the first host resources;
program instructions to, responsive to determining the first host resource no longer has an amount of available virtual adapters that meets a maximum capacity parameter of the one or more parameters, deactivate the first host resource, wherein the first host resource remains allocated to the first resource consumer; and
program instructions to allocate to the first resource consumer, a second host resource that has the amount of available virtual adapters that meets the maximum capacity parameter.

2. The computer program product of claim 1, further comprising program instructions, stored on the one or more computer readable storage media, which when executed by a processor, cause the processor to:
responsive to determining the host resource requirements do not include the list of host resource pools for a third resource consumer, identify one or more host resource characteristics;
identify a second set of eligible host resource pools; and
allocate host resources from the second set of eligible host resource pools based on the allocation policy.

3. The computer program product of claim 2, further comprising program instructions, stored on the one or more computer readable storage media, which when executed by a processor, cause the processor to:
determine a quality of a current resource allocation for the third resource consumer;
determine a quality of a new resource allocation for the third resource consumer; and
responsive to determining the quality of the new resource allocation for the third resource consumer does not exceed the quality of the current resource allocation for the third resource consumer, determine not to reallocate based on the new resource allocation.

4. The computer program product of claim 2, wherein the one or more host resource characteristics specify one or more of an adapter type, a connectivity type for an adapter, and an accelerator engine.

5. The computer program product of claim 1, further comprising program instructions, stored on the one or more computer readable storage media, which when executed by a processor, cause the processor to:
determine a quality of a current resource allocation for the first resource consumer;
determine a quality of a new resource allocation for the first resource consumer; and
responsive to determining the quality of the new resource allocation for the first resource consumer exceeds the quality of the current resource allocation for the first resource consumer, reallocate host resources based on the new resource allocation.

6. The computer program product of claim 1, wherein the one or more parameters of the allocation policy include maximum availability, maximum capacity, lowest utilization, and priority.

7. The computer program product of claim 1, wherein the host resource requirements include mandatory allocation requirements and optional allocation requirements.

8. A computer system for policy based virtual resource allocation, the computer system comprising:
one or more computer processors;
one or more computer readable storage media; and
program instructions stored on the computer readable storage media for execution by at least one of the one or more computer processors, the program instructions comprising:
program instructions to identify a number of host resources specified by host resource requirements for a first resource consumer;
program instructions to, responsive to determining that the host resource requirements includes a list of host resource pools for the first resource consumer, identify a first set of eligible host resource pools, wherein the first set of eligible host resource pools includes at least a first host resource that is re-allocable from an inactive second resource consumer;
program instructions to allocate to the first resource consumer, host resources from the first set of eligible host resource pools based on an allocation policy that includes one or more parameters for allocating host resources, wherein the allocated host resources from the first set of eligible host resource pools include the first host resources;
program instructions to, responsive to determining the first host resource no longer has an amount of available virtual adapters that meets a maximum capacity parameter of the one or more parameters, deactivate the first host resource, wherein the first host resource remains allocated to the first resource consumer; and
program instructions to allocate to the first resource consumer, a second host resource that has the amount of available virtual adapters that meets the maximum capacity parameter.

9. The computer system of claim 8, further comprising program instructions, stored on the one or more computer readable storage media, which when executed by a processor, cause the processor to:
responsive to determining the host resource requirements do not include the list of host resource pools for a third resource consumer, identify one or more host resource characteristics;
identify a second set of eligible host resource pools; and
allocate host resources from the second set of eligible host resource pools based on the allocation policy.

10. The computer system of claim 9, further comprising program instructions, stored on the one or more computer readable storage media, which when executed by a processor, cause the processor to:
  determine a quality of a current resource allocation for the third resource consumer;
  determine a quality of a new resource allocation for the third resource consumer; and
  responsive to determining the quality of the new resource allocation for the third resource consumer does not exceed the quality of the current resource allocation for the third resource consumer, determine not to reallocate based on the new resource allocation.

11. The computer system of claim 8, further comprising program instructions, stored on the one or more computer readable storage media, which when executed by a processor, cause the processor to:
  determine a quality of a current resource allocation for the first resource consumer;
  determine a quality of a new resource allocation for the first resource consumer; and
  responsive to determining the quality of the new resource allocation for the first resource consumer exceeds the quality of the current resource allocation for the first resource consumer, reallocate host resources based on the new resource allocation.

12. The computer system of claim 8, wherein the one or more parameters of the allocation policy include maximum availability, maximum capacity, lowest utilization, and priority.

13. The computer system of claim 8, wherein the host resource requirements include mandatory allocation requirements and optional allocation requirements.

14. The computer system of claim 8, wherein the one or more host resource characteristics specify one or more of an adapter type, a connectivity type for an adapter, and an accelerator engine.

* * * * *